United States Patent [19]

Kluge

[11] 4,214,774

[45] Jul. 29, 1980

[54] DISASSEMBLABLE BOAT CARRIER AND LAUNCHER

[75] Inventor: Ronald P. Kluge, 5902 Bustleton Ave., Philadelphia, Pa. 19149

[73] Assignees: Ronald P. Kluge, Philadelphia; Herman F. Spirk, Prospect Park, both of Pa.

[21] Appl. No.: 21,286

[22] Filed: Mar. 16, 1979

[51] Int. Cl.³ ............................................... B60P 3/10
[52] U.S. Cl. ..................................... 280/652; 280/40; 280/47.13 B; 280/63; 280/414 R
[58] Field of Search ........ 280/414 R, 414 A, 47.13 B, 280/638, 652, 655, 35, 40, 42, 63

[56] References Cited

U.S. PATENT DOCUMENTS

| | | | |
|---|---|---|---|
| 2,468,914 | 5/1949 | Banaszak et al. | 280/40 |
| 2,608,418 | 8/1952 | Finlayson et al. | 280/414 R |
| 2,636,745 | 4/1953 | Cartwright | 280/414 R |
| 2,810,589 | 10/1957 | Tarleton | 280/414 R |
| 2,938,735 | 5/1960 | Bennett | 280/414 R |
| 2,970,846 | 2/1961 | Boston | 280/40 |
| 3,046,034 | 7/1962 | Herrick | 280/35 |
| 3,098,245 | 7/1963 | Corey et al. | 280/414 R |
| 3,612,563 | 10/1971 | Kazmark, Sr. | 280/655 |
| 3,985,372 | 10/1976 | Olsson | 280/652 |

*Primary Examiner*—John J. Love
*Assistant Examiner*—Donn McGiehan
*Attorney, Agent, or Firm*—Michael F. Petock

[57] ABSTRACT

A disassemblable boat carrier and launcher is disclosed which may be used by an individual to manually maneuver a boat from a automotive vehicle to the water and launch the boat in the water without assistance. The longitudinal tongue of the boat carrier may be disassembled and the wheeled support section may be folded for compact storage on the boat. The storability of the boat carrier at either the automotive vehicle or on the boat while the boat is in use on the water eliminates the need for unnecessary trips between the water and the automotive vehicle. The boat carrier enables the transporting of the boat between the automotive vehicle and the water, the launching of the boat into the water and the retrieving of the boat from the water by a single person.

8 Claims, 6 Drawing Figures

DISASSEMBLABLE BOAT CARRIER AND LAUNCHER

BACKGROUND OF THE INVENTION

The present invention relates to a disassemblable boat carrier and launcher. More particularly, the present invention relates to a disassemblable boat carrier and launcher for the wheeling of small boats between an automotive vehicle and the water, the launching of the boat into the water and the retreiving of the boat from the water.

Small boats, particularly of the pram or so called "car top" type are now popular for use for recreation and for fishing. Such boats are typically ten (10) to sixteen (16) feet long and often present serious portage problems in transporting the boat from an automotive parking area to the water and returning it. Transporting the boat, which is often loaded with gear and equipment, between the car and the water is often a cumbersome feat. It is not uncommon for the closest parking area to be some distance from the water, and without the use of the present invention, the transporting of the boat and equipment may require several trips. Furthermore, without the use of the present invention, the launching of the boat usually requires at least two people.

With the use of the present invention, one person can move the boat, loaded with gear and equipment, to the water in a single trip. The boat may be launched into the water containing the gear and equipment by the use of the present invention. The boat carrier and launcher of the present invention may then be partially disassembled by taking apart the sections which make up the longitudinal tongue of the boat carrier and folding the wheeled support section so that the boat carrier and launcher may be compactly stored on board the boat, thereby saving an unnecessary trip back to the automotive vehicle to store the boat carrier. The boat carrier of the present invention may also be used to retrieve the boat from the water, with the gear and equipment on the boat, with the boat with the gear thereon being transported back to the automotive vehicle in a single trip. The boat carrier of the present invention can them be partially disassembled and folded and stored with the gear, eliminating the need for a trailer hitch on the vehicle.

In the past attempts at foldable boat carriers have included a pair of foldable wheels on a frame such as that disclosed in U.S. Pat. No. 2,970,846 and the mounting of a trundling mechanism directly to the boat as a permanent attachment on the boat, such as that disclosed in U.S. Pat. No. 3,098,245. U.S. Pat. No. 2,608,418 discloses a collapsible boat trailer of the vehicular type which may be towed by an automobile. This patent discloses a parallelogram link system for supporting a pair of wheels and a foldable longitudinal tongue member. None of the prior art discloses a boat carrier and launcher structure wherein the longitudinal tongue member may be disassembled and the wheel support members folded along the transverse support member wherein the boat carrier may be used to easily move a boat loaded with gear from the automobile and launch it directly into the water by a single person.

SUMMARY OF THE INVENTION

The present invention enables a single person to move a boat from an automotive parking area to the water loaded with gear and to launch the boat with the gear and/or equipment already on the boat. The boat carrier of the present invention may be partially disassembled by disassembling the several sections which make up the longitudinal tongue of the boat carrier. The support members having the wheels mounted thereon may be folded substantially parallel to the transverse member for compact storage of the whole boat carrier on the boat during use.

The boat carrier and launcher of the present invention may be quickly and easily disassembled and assembled. The transverse assembly with the wheels thereon may be quickly placed in condition for use by pivoting the support members with the wheels thereon into the substantially vertical position for use. The longitudinal tongue member may be quickly assembled by sliding the sections together and fastening them by either tightening a compression nut or a pinning means such as a pin or a bolt passing through both of the joint sections. The boat may be firmly held on the boat carrier by means of straps, which may be of an elastic type or adjustable to firmly hold the boat to the boat carrier.

Briefly, in accordance with the present invention, a readily disassemblable manually manueverable boat carrier is disclosed which is provided with a longitudinal tongue member comprised of a plurality of sections which are releasably fastened together. The longitudinal tongue member is provided with a handle at its forward end. A transverse assembly is provided at the rear end of the boat carrier. The transverse assembly includes a transverse member with a connecting means located centrally thereon for releasably connecting with the rear end of the longitudinal tongue member. A support member is pivotally connected intermediate the ends thereof to each end of the transverse member. Each of said support members is provided with a wheel at or near its lower end and a boat hull support means at its upper end. Adjustable bracket means are provided. The adjustable bracket means are lockable in a position for holding the support members in a substantially vertical position during use in transporting a boat and allowing pivoting of the support members substantially parallel to the transverse member for storage. Support means for supporting the forward hull portion of the boat is mounted on the longitudinal tongue member between the handle and the rear of the tongue member.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
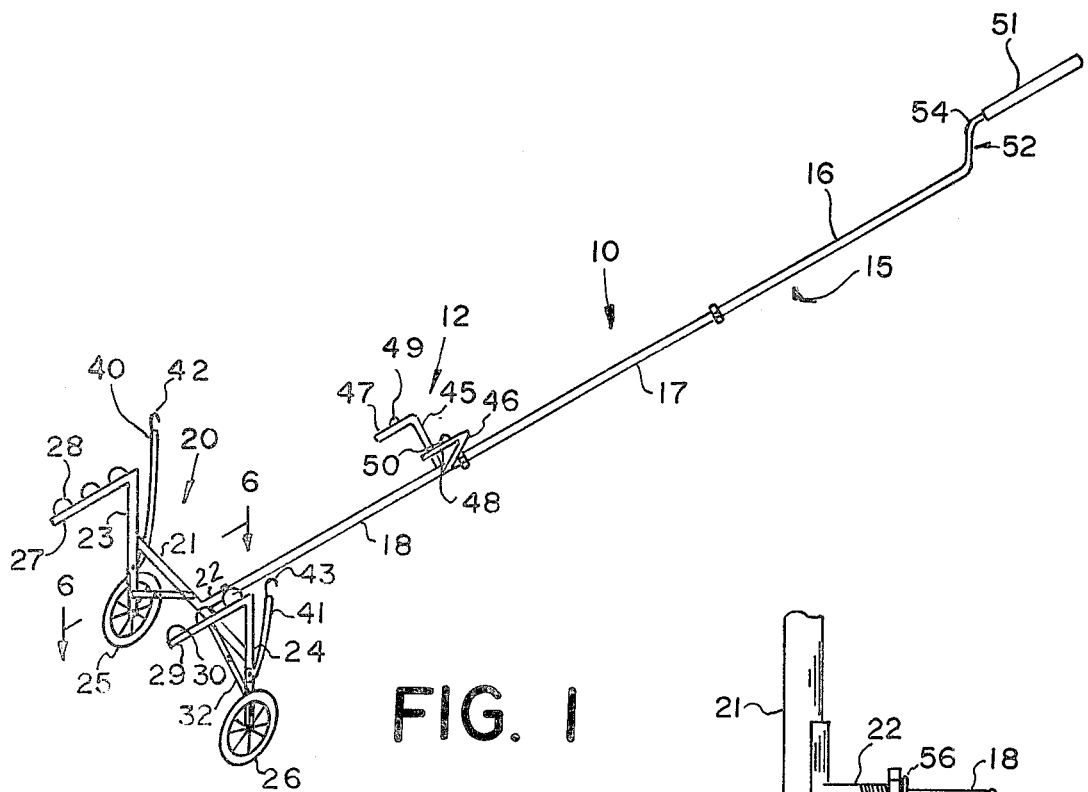
FIG. 1 is a view in perspective of a boat carrier and launcher in accordance with the present invention.
Figure 2:
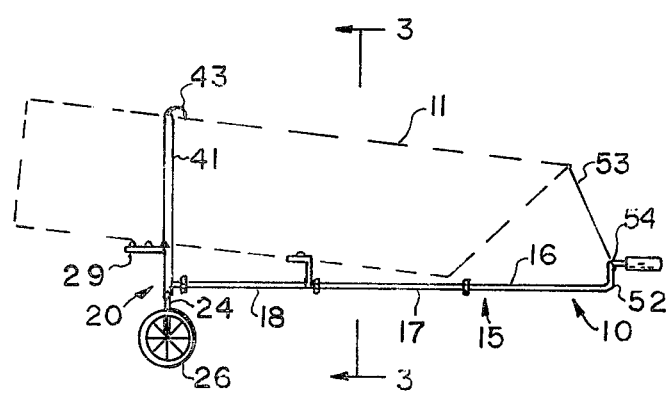
FIG. 2 is a side elevation view of the boat carrier and launcher in accordance with the present invention including the dotted outline of a boat mounted thereon.
Figure 3:
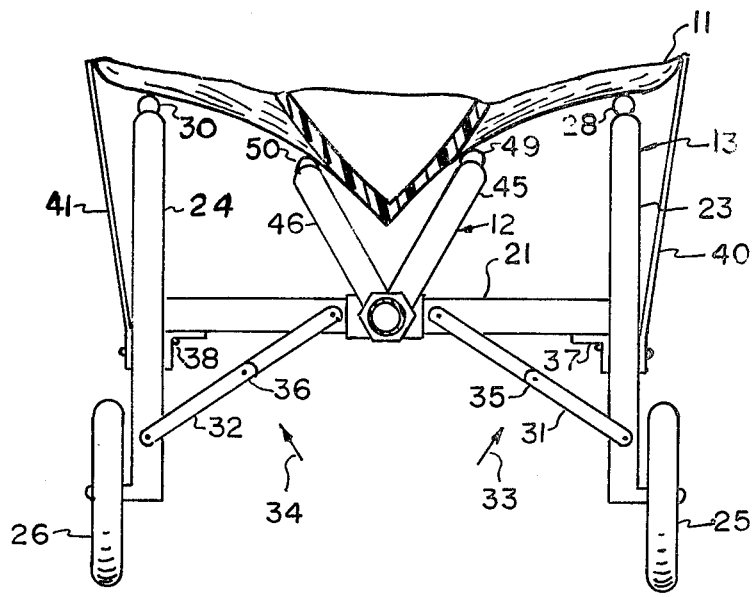
FIG. 3 is a cross sectional view taken along line 3—3 of FIG. 2 including a broken out portion of the hull of a boat mounted thereon.

Referring now to the drawings in detail wherein like numerals indicate like elements, there is shown in FIG. 1 a perspective view of a boat carrier and launcher 10. A side elevation view of the boat carrier and launcher 10, which may be sometimes hereinafter referred to merely as the boat carrier, is shown in FIG. 2 with a boat 11 mounted thereon in dotted outline form. FIG. 3 is a partial cross sectional view taken along 3—3 of FIG. 2 showing a bottom portion of a hull of a boat as rests on the forward boat supports 12 and the aft boat supports 13. Reference should be made in FIGS. 1, 2 and 3, taken collectively in the following description.

Figure 6:
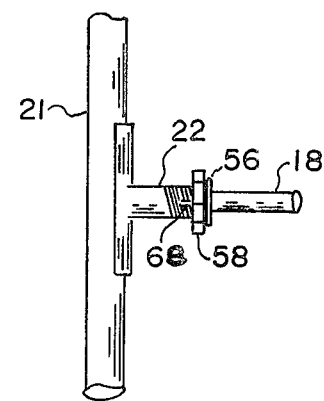
FIG. 6 is a partial plan view taken along line 6—6 of FIG. 1.
Figure 4:
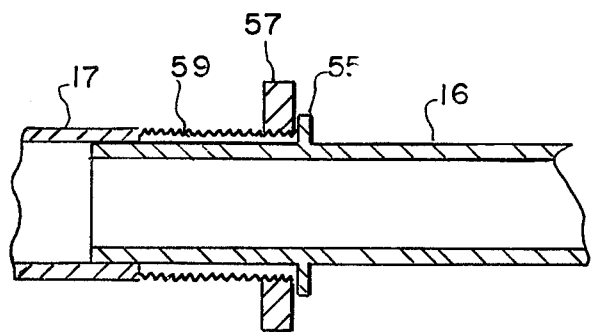
FIG. 4 is a cross sectional view of one embodiment of a means for fastening together the sections of the longitudinal tongue member.
Figure 5:
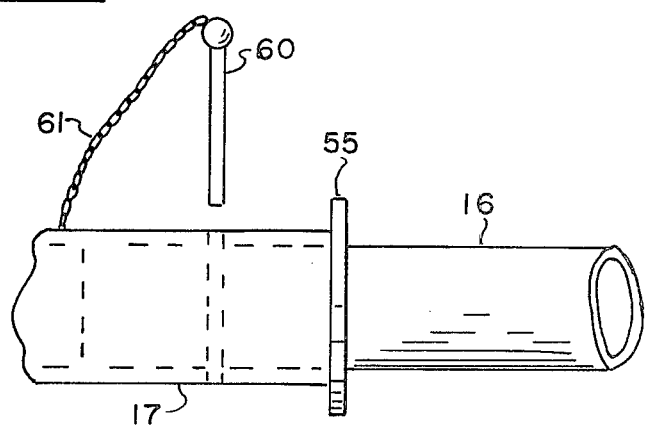
FIG. 5 is a side elevational view of another embodiment of a fastening means for fastening together the sections of the longitudinal tongue member.

Boat carrier 10 is comprised of a longitudinal tongue member 15 and a transverse assembly 20. The longitudinal tongue member 15 is comprised of a plurality of sections fastened together, namely, in the preferred embodiment, sections 16, 17 and 18. Although, for a typical boat length in the range of 10 and 16 feet, it is presently preferred to use three (3) sections for the longitudinal tongue member 15, it is understood that more or less sections may be used as desired. The sections may be fastened together by various suitable locking means which enable rapid connecting together of the sections and rapid disassembling of the sections with a minimum of effort. Two presently preferred fastening systems are shown in FIGS. 4, 5 and 6 and will be discussed hereinafter.

The transverse assembly 20 is comprised of a transverse member 21 with connecting means 22 located centrally on transverse member 21 for releasably connecting the rear end of longitudinal tongue 15, that is the rear end of section 18 of longitudinal tongue member 15, to the transverse assembly 20. Connecting member 22 is shown in greater detail in FIG. 6. The fastening operation of connecting member 22 will be discussed hereinafter.

Support members 23 and 24, collectively referred to previously as the aft boat supports 13, are pivotally connected intermediate the ends thereof to each end of the transverse member 21. Aft support members 13 are each provided with a wheel at or near the lower end. Support member 23 is provided with wheel 25 and support member 24 is provided with wheel 26. Support member 23 is provided with a boat hull support means 27 which may have protective means thereon in the form of pads or rollers 28. Similarly, support member 24 is provided with a boat hull support 29 having a protective means in the form of pads or rollers 30. However, it is understood that the protective means on the boat hull support means 27 and 29 may take other forms, such as a continuous padding member which would merely slide over boat hull supports 27 and 29.

Support members 23 and 24 are maintained in a substantially vertical position during use by means of adjustable bracket means 31 and 32, respectively. Adjustable brackets 31 and 32 are lockable in the position shown to maintain support members 23 and 24 in the substantially vertical position during use in transporting a boat. Adjustable brackets 31 and 32 may be adjusted in the direction of arrows 33 and 34, respectively by pivoting on pivot points 35 and 36, respectively. The adjustment of brackets 31 and 32 in this manner allows members 23 and 24 to pivot intermediate the ends thereof on hinges 37 and 38, respectively, thereby allowing members 23 and 24 to be folded onto transverse member 21. All of this is most clearly seen in FIG. 3.

Straps 40 and 41 are mounted to support members 23 and 24, respectively. Straps 40 and 41 are provided on their upper ends with hooks or other suitable fastening means 42 and 43 for attaching to the boat so that the straps 40 and 41 may hold the boat firmly on boat hull support members 27 and 29. Straps 40 and 41 may be made of an elastic material which allows the straps to automatically adjust to different size boats, within limits, without the need for adjusting the straps. Alternatively, the straps may be made of other substantially non-elastic materials, such as rope or leather, with suitable adjusting means to allow for adjustment to provide a firm hold down tension on the boat. It is desirable that hold down straps of some suitable type be provided in order to ensure that the boat is maintained on boat carrier 10, especially where the boat carrier 10 may be taken over somewhat rough terrain.

Forward boat support means 12 is comprised of members 45 and 46 arranged to form a V. The upper ends of members 45 and 46 are provided with hull support members 47 and 48 respectively and are preferably provided with suitable hull protecting means, such as suitable padding 49 and 50.

The forward end of longitudinal tongue member 15, and particularly the forward end of section 16 of longitudinal tongue member 15, is provided with a handle 51 which is preferably padded. Section 16 may also be provided with a curved section 32 which provides a more comfortable wheeling height and provides a tying place for the boat rope 53 at point 54 of the curve.

Referring now to the FIGS. 4 and 6, there is shown a presently preferred embodiment of the fastening means for fastening together the sections of longitudinal tongue member 15 and for fastening the end of longitudinal tongue member 15 to transverse assembly 20. Preferably, the sections slide into one another such as the rear end of section 16 sliding into the forward end of section 17 or the rear end of section 18 sliding into connecting means 22. The section which goes into the other section is preferably provided with a stop means, such as stop washer 55 on section 16 and stop washer 56 on section 18. Stop washer 55 is physically connected to pipe 16, such as by spot welding in the case of weldable metal and by forming in the case where the boat carrier may be fabricated from a rigid synthetic plastic material. Once the section is properly inserted into the other up to the stop means, threaded compression means 57, 58 is turned to compress the slit sections of the outer pipe against the outer surface of the inner pipe 16, 18. The outer pipe or connecting means is provided with slits 59, 68 which allow the outer pipe section to be readily compressed against the inner pipe thereby holding the two sections tightly together. Connecting means 22 may be welded or bolted to transverse member 21, depending upon the preferred method of fabrication, and whether this is factory fabricated or sold in kit form for assembly by the boat user.

FIG. 5 discloses an alternate embodiment of fastening together the sections of longitudinal tongue member and for use as fastening the end of longitudinal tongue member 15 to connecting means 22. There is shown in FIG. 5 section 16 having a stop means 55 thereon. Section 16 is shown as being inserted into the forward end of section 17. The two sections are firmly held together by means of inserting a pin 60 through a hole pre-drilled through both sections. Loss of pin 60 may be avoided by securing pin 60 to section 17 by means of a chain 61. Pin 60 is illustrated for purposes of illustration, but it is understood that any suitable type of a member passing through the two sections may be used, such as for example, a threaded fastener such as a bolt.

The present invention may be embodied in other specific forms without departing from the spirit or essential attributes thereof and, accordingly, reference should be made to the appended claims, rather than to the foregoing specification as indicating the scope of the invention.

I claim:

1. A readily disassemblable manually maneuverable boat carrier, comprising:
   a longitudinal tongue member comprised of a plurality of sections releasably fastened together, said longitudinal tongue member being provided with a handle at its forward end;
   a transverse assembly, said transverse assembly having a transverse member with a connecting means located centrally thereon for releasably connecting with the rear of said longitudinal tongue member, a support member pivotally connected intermediate the ends thereof to each end of said transverse member, each of said support members being provided with a wheel at or near its lower end and a boat hull support means at its upper end, adjustable bracket means lockable in a position for holding said support members in a substantially vertical position during use in transporting a boat and allowing pivoting of said support members substantially parallel to said transverse member when not engaged in said use; and
   support means for the forward section of the boat hull mounted on said longitudinal tongue member between said handle and the rear end of said tongue member.

2. A readily disassemblable manually maneuverable carrier in accordance with claim 1 including elastic hold down elements mounted to said transverse assembly at one end and being connectable to the upper edge of a boat for firmly holding the boat on the carrier.

3. A readily disassemblable manually maneuverable boat carrier in accordance with claim 1 wherein the sections of the longitudinal tongue member are releasably fastened together by means of a threaded compression fastening means wherein the inner wall of one of the sections is compressed against the outer surface of the portion of another section received therein.

4. A readily disassemblable manually maneuverable boat carrier in accordance with claim 1 wherein the sections of the longitudinal tongue member are releasably fastened together by means of an element passing through the walls of the sections wherein the end of one section has been received within the end of the other section.

5. A readily disassemblable manually maneuverable boat carrier in accordance with claims 3 or 4 wherein the section of the longitudinal tongue member which is received in a second section for fastening together is provided with a stop means to provide a predetermined degree of insertion in the second stop member.

6. A readily disassemblable manually maneuverable boat carrier in accordance with claim 1 wherein a protective means is provided on said support means to protect the hull of the boat from damage.

7. A readily disassemblable manually maneuverable boat carrier in accordance with claim 1 wherein the pivot connection at each end of said transverse member is provided by a hinge.

8. A readily disassemblable manually maneuverable boat carrier in accordance with claim 1 wherein said forwardly mounted support means mounted on the tongue member is comprised of a pair of elements arranged to form a "V".

* * * * *